US011849173B1

(12) United States Patent
Wu et al.

(10) Patent No.: US 11,849,173 B1
(45) Date of Patent: Dec. 19, 2023

(54) COMPUTER-IMPLEMENTED METHODS FOR QUALITY OF SERVICE OPTIMIZATION USING A CONTENT ADAPTIVE SLATE IMAGE

(71) Applicant: Amazon Technologies, Inc., Seattle, WA (US)

(72) Inventors: Yongjun Wu, Bellevue, WA (US); John F. X. Gaquin, Lynnwood, WA (US); Andrew Joseph Whittaker, Seattle, WA (US); Harshil Vikram Katira, Seattle, WA (US); Mairo Pedrini, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/705,989

(22) Filed: Mar. 28, 2022

(51) Int. Cl.
*H04N 21/431* (2011.01)
*H04N 21/854* (2011.01)
*H04N 21/218* (2011.01)
*H04N 21/235* (2011.01)
*H04N 21/8549* (2011.01)
*H04N 21/2187* (2011.01)

(52) U.S. Cl.
CPC ..... *H04N 21/4312* (2013.01); *H04N 21/2187* (2013.01); *H04N 21/2353* (2013.01); *H04N 21/8549* (2013.01)

(58) Field of Classification Search
CPC ........... H04N 21/4312; H04N 21/2187; H04N 21/2353; H04N 21/8549
USPC .......................................................... 725/32
See application file for complete search history.

(56) References Cited

U.S. PATENT DOCUMENTS

| | | | |
|---|---|---|---|
| 8,424,034 B2 * | 4/2013 | Bokor | H04N 21/8586 725/32 |
| 11,032,589 B1 * | 6/2021 | Inskip | H04N 21/812 |
| 2015/0256583 A1 * | 9/2015 | Rosenzweig | H04L 67/1095 709/219 |
| 2016/0269781 A1 * | 9/2016 | Waldron | H04N 21/4532 |
| 2020/0154165 A1 * | 5/2020 | Cohen | G06V 20/49 |
| 2020/0304868 A1 * | 9/2020 | Ganjam | H04N 21/44209 |
| 2021/0168416 A1 * | 6/2021 | Weiner | H04N 21/2625 |
| 2022/0188877 A1 * | 6/2022 | Fokins | G06Q 30/0269 |
| 2022/0239949 A1 * | 7/2022 | Hannuksela | H04N 19/105 |

* cited by examiner

*Primary Examiner* — Dominic D Saltarelli
(74) *Attorney, Agent, or Firm* — NICHOLSON DE VOS WEBSTER & ELLIOTT LLP

(57) ABSTRACT

Techniques for a quality of service optimization using a content adaptive slate image in a media player application are described. According to some embodiments, a computer-implemented method includes sending a request for a video from a client device to a content delivery service that is separate from the client device; receiving, by the client device from the content delivery service, a manifest of the video and an intro slate separate from the manifest and separate from the video; displaying the intro slate on the client device; loading an initial frame of the video identified by the manifest onto the client device concurrently with the displaying of the intro slate; and displaying the video on the client device after the displaying of the intro slate.

20 Claims, 12 Drawing Sheets

COMPUTER-IMPLEMENTED METHODS FOR QUALITY OF SERVICE OPTIMIZATION USING A CONTENT ADAPTIVE SLATE IMAGE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various embodiments in accordance with the present disclosure will be described with reference to the following drawings.

DETAILED DESCRIPTION

Figure 1:
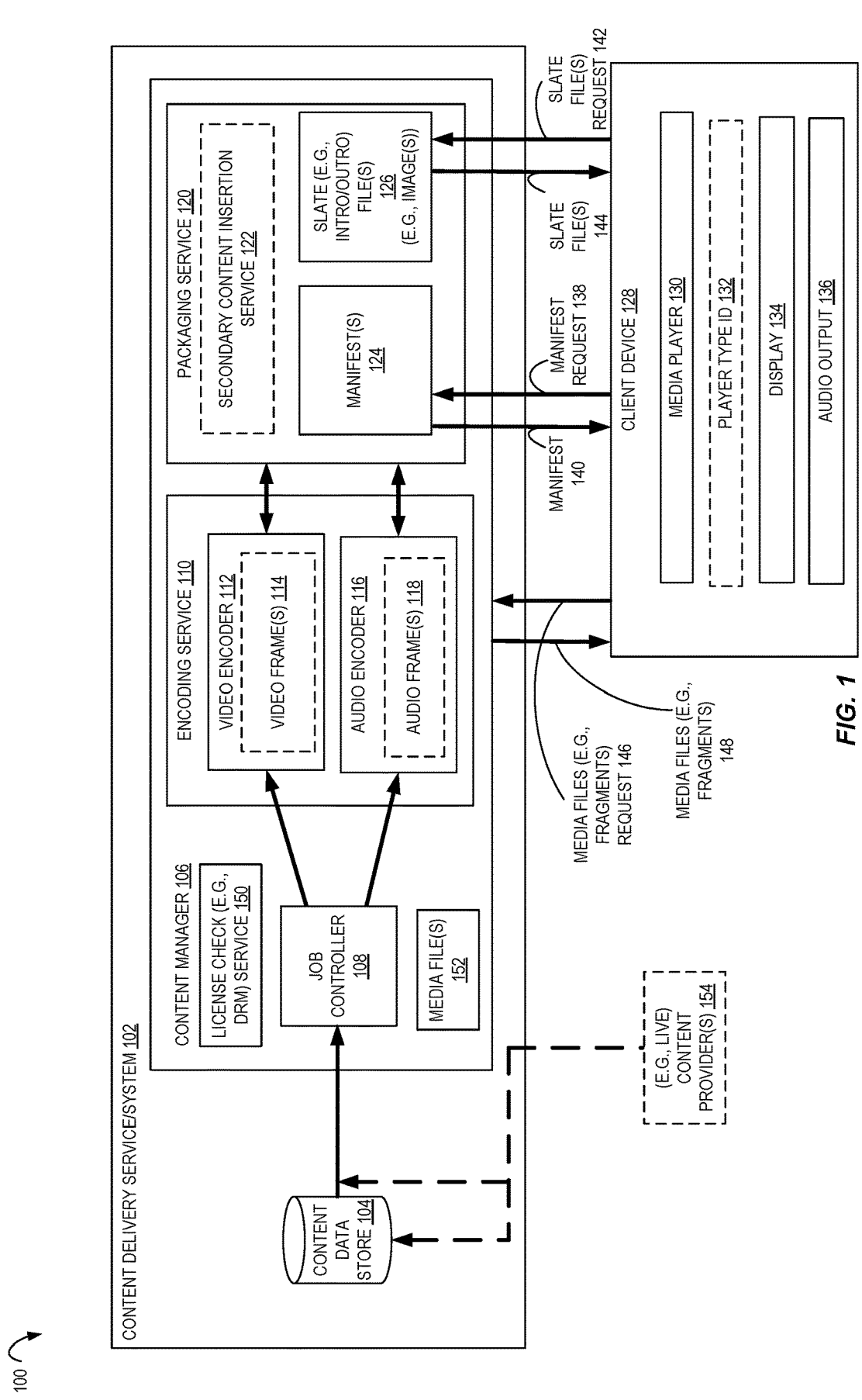
FIG. 1 is a diagram illustrating an environment including a content delivery service/system having a packaging service to implement a quality of service optimization by sending a content adaptive slate for a video to a client device separate from the video (and/or separate from a manifest for the video) according to some embodiments.

The present disclosure relates to methods, apparatus, systems, and non-transitory computer-readable storage media for a quality of service optimization using a (e.g., content adaptive) slate image. Certain embodiments herein are directed to a computer-implemented service and/or user device (e.g., client device) (e.g., non-transitory computer-readable medium stored on the device) to hide and/or reduce the time to a first frame (e.g., and duration of displaying a waiting (e.g., loading) indication (e.g., spinner animation)) to a user (e.g., client). Certain embodiments herein display a slate concurrently with loading (e.g., downloading via the internet) of media (e.g., a video), e.g., to hide and/or reduce the time to a first frame and/or the time spent displaying a waiting (e.g., loading) indication (e.g., spinner animation). In certain embodiments, the slate is based on content within the media (e.g., video), for example, a slate that is adapted to the content of the video. In certain embodiments, when (e.g., content adaptive/specific) slate images are to be present for various purposes, such as messages for customers about where they are, they are also utilized for a quality of service (QoS) optimization, e.g., by hiding and/or reducing time to first frame and/or spinner animation duration, increasing the starting video quality (e.g., bit rate) in the beginning of a video, and hence increasing the percentage of a video that is displayed in a higher resolution (e.g., in ultra-high-definition (UHD) and/or high-definition (HD)) (e.g., in short-term content). In certain embodiments, one or more slate images are (i) delivered outside of manifests and/or the video files (e.g., fragments, clips, or packets about video data, for example, a manifest and/or video file according to a streaming standard, e.g., a Transmission Control Protocol (TCP) and/or User Datagram Protocol (UDP) based streaming), (ii) are cacheable, and/or (iii) are rendered on the user (e.g., client device) side. In certain embodiments, the video streaming is according to a standard, e.g., a Dynamic Adaptive Streaming over HyperText Transfer Protocol (HTTP) (e.g., "MPEG-DASH" standard), an HTTP Live Streaming (HLS) standard, a Smooth Streaming standard, a UDP based standard, such as, but not limited to, video streaming from Sye® live streaming, or any other streaming protocols. Certain embodiments herein display a slate (e.g., intro slate and/or outro slate) on a display (e.g., screen) with client-side rendering rather than encoding them (e.g., "burning" them) into the video. In certain embodiments, an intro slate (e.g., intro scene or intro card) is an introductory image or video to be shown before the beginning of "main" video content and/or an outro slate (e.g., outro scene or outro card) is a closing image or video to be shown after the end of "main" video content. In certain embodiments, a (e.g., non-advertisement) slate is customized based on the video to be shown (or that was just shown).

In certain embodiments, a slate is encoded (e.g., on the content delivery service/system side in contrast to occurring on the client side) (e.g., "burned in") into the multimedia (e.g., video). For example, with a slate image as the first (e.g., in display order) frame (or first proper subset of frames) of the multimedia (e.g., video) as delivered to a client device. In certain embodiments, one or more slate images are encoded into the video (e.g., segment(s)) matching the live stream encoding and then stitched onto the beginning and/or end of the multimedia (e.g., video), for example, bookending one or more clips in the multimedia (e.g., video). However, such embodiments cause issues such as if the slate(s) are burned into the video, the slate cannot be used to cover any loading indication (e.g., "spinners") occurring in the background while the player loads the video (e.g., initial frames of the video) and/or transitions from a first video to a second video. This results in a poorer client (e.g., customer) experience where the client (e.g., customer) will see (i) a loading indication (e.g., spinner) for some duration of time, followed by another duration (e.g., 1-2 seconds) of slate, and/or (ii) a duration of (e.g., 1-2 seconds) of outro slate followed by a loading indication (e.g., spinner) as the player shifts to another video (e.g., a live stream). Certain of these embodiments are particularly latency heavy for certain (e.g., Sye-enabled Android) media players, e.g., media players that change from displaying (e.g., decoding) a fragment type of video (e.g., HTTP) to displaying (e.g., decoding) one of multiple adaptive bit rate (ABR) streams of different bit rates (e.g., where a client can switch between streams without waiting for a segment to end) (e.g., a stream without segments) (e.g., Sye® technology), e.g., where such a change causes the entire player to reload which takes another duration of time (e.g., 4-12 seconds).

Embodiments herein overcome these issues by a providing (e.g., vending) a slate (e.g., an intro slate and/or an outro slate) separately from the video the slate corresponds to. In certain embodiments, a (e.g., computer-implemented) content delivery service/system and/or a user device (e.g., a client device) (e.g., a non-transitory computer-readable medium stored on the device) are to send and receive, respectively, a slate separately from the video the slate corresponds to. For example, where the slate is separate from the video itself (e.g., separate from the delivered frames thereof) and/or separate from a manifest for the video. Thus, in certain embodiments, the displaying of a separately delivered slate (e.g., without having to wait on the video to be ready to display as when the slate is provided to the device as part of the video) is used to hide and/or reduce the time to a first frame and/or reduce the duration of displaying a waiting (e.g., loading) indication (e.g., spinner animation)) to a user (e.g., client).

In certain embodiments, a slate (e.g., intro slate and/or outro slate) is vended as a response to a request for a video from a user (e.g., client), e.g., the slate vended separately from the video resources. In one embodiment, each slate is a single (e.g., HD JPEG standard) image, e.g., such that an intro slate and outro slate (e.g., two total) are provided by a content delivery service/system to a user (e.g., client) device for a video. As one example, a first video (e.g., with corresponding audio) is a recap (e.g., highlights) of a live event (e.g., up to about a time the live event is to be displayed on the client device) and a second video is the live event (e.g., joined in progress), e.g., where the intro slate for the first video and/or the outro slate for the first video are provided separately from the first video itself (e.g., separate from the delivered frames thereof).

In certain embodiments, a request for a slate (e.g., the request including a URL address(es) for the slate) is separate from a request for video (e.g., the request including a (e.g., different) URL address(es) for the video). In certain embodiments, a request for a slate includes an identification (ID) value for the slate and/or a request for a video includes an identification (ID) value for the video, for example, where an identification value is generated for a specific publication of an asset so that it can be used as a key, e.g., for asset deletion and/or cache eviction.

In certain embodiments, each slate (e.g., slate image) is available from a content delivery service/system in multiple qualities and/or resolutions, e.g., to optimize the initial download of the slate. In certain embodiments, rendering slates as image overlays on-device allows the display of the slate to a user (e.g., customer) while (e.g., concurrently with) the loading of the video (e.g., and/or manifest) is occurring, thus streamlining the customer experience and reducing overall latency.

In certain embodiments, slates that are burned into the video appear as additional periods in the manifest alongside (e.g., main content) video (e.g., clips), for example, with this complicating media player logic that shows a progress indicator (e.g., progress bar) for individual videos (e.g., clips) as they are to distinguish video (e.g., clip) periods from slate periods. In certain embodiments, rendering slates as image overlays on-device allows media players to keep progress indicators simple, e.g., one for each period in the manifest.

In certain embodiments, any slates added to the manifest increase the total duration of the (e.g., recap) video, e.g., which causes issues with orchestrating display of clips based on total duration (e.g., caps) maintained when selecting clips, as well as potential operational complexity when the expected duration of a clip (e.g., without any slate display duration(s)) does not match an actual duration in practice (e.g., that includes the slate display duration(s)) that may exceed the known caps put in place. Thus, removing slates from the manifest keeps overall (e.g., recap) video asset duration consistent in all systems, and avoids confusion about total duration. In certain embodiments, a (e.g., not live) recap video is a proper subset of a second (e.g., live stream) video, e.g., highlights (e.g., a summary of the most interesting and/or noteworthy content) (e.g., up to about the current time).

In certain embodiments, a slate is separate from a user interface of a media player, e.g., the slate is displayed after a play interface element (e.g., play button) is selected (e.g., but before the video is played). In certain embodiments, a slate is displayed while (e.g., concurrently with) a license for the multimedia (e.g., video) to be played is checked by a client device (e.g., such that the multimedia is only to play if the license is verified), for example, a digital rights management (DRM) license (e.g., as checked by a DRM service of content delivery service/system). In certain embodiments, a slate is customized based on the content in the video (for example, but is not an advertisement or commercial, e.g., for another product other than the video), e.g., an intro slate customized for a video that is next to be played and/or an outro slate customized for a video that is ending playing. In certain embodiments, a slate includes (or does not include) a name and/or logo for a video provider (e.g., "television network").

Certain embodiments herein display a slate (e.g., intro slate and/or outro slate) on a display with client-side rendering rather than encoding them (e.g., burning them) into the video, for example, where doing so allows the separately delivered slate to be displayed while the player loads (e.g., downloads from a content delivery service) a to-be-displayed video, and thus effectively reduces (or eliminates) any time displaying a loading indication (e.g., spinner animation). In certain embodiments, the slate image(s) are delivered outside manifests and/or the video (e.g., fragments, clips, or packets) itself, for example, where a download of the slate image(s) is in parallel with a download of the video (e.g., and/or the manifest for that video). In certain embodiments for live sporting events, a slate is customized with the non-final score at the time of joining an in-progress live stream.

Embodiments herein improve the functioning of a computer-implemented content delivery service/system and a client device by allowing them to send and receive, respectively, a slate separately from a video the slate corresponds to, and thus allows display of the separately delivered slate (e.g., without having to wait on the video to be ready to display as when the slate is provided to the client device as an encoded part of the video) by the client device to hide and/or reduce the time to a first frame (e.g., caused by loading and/or license checking) and/or reduce the duration of displaying a waiting (e.g., loading) indication (e.g., spinner animation)) on the client device.

FIG. 1 is a diagram illustrating an environment 100 including a content delivery service/system 102 having a packaging service 120 to implement a quality of service optimization by sending a content adaptive slate 126 (e.g., image) for a video to a client (e.g., viewer) device 128 separate from the video files 148 (and/or separate from a manifest 140 for the video) according to some embodiments.

The depicted content delivery service/system 102 includes a content data store 104, which may be implemented in one or more data centers. As one example, a media file (e.g., including a video file and audio file) (e.g., a media container) that is to be encoded is accessed from the content data store 104 by content manager 106. The media file may be uploaded to content data store 104 by content provider(s) 154 or provided directly (e.g., as live content) to content manager 106 by content provider(s) 154 (e.g., from a live content encoder).

In certain embodiments, the content manager 106 includes a job controller 108 to control each encoding job. In certain embodiments, job controller 108 controls the encoding (e.g., transcoding) of a media file into packages and files in various formats and/or in different sizes for distribution to end users (e.g., viewers). In certain embodiments, a user (e.g., separate from an end user or client) creates a job for a (e.g., uncompressed) multimedia file from content data store 104 by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain embodiments, to set up a job in job controller 108, a user specifies the input files (e.g., from content data store 104) for the service to encode (e.g., transcode from one format to a different format), for example, by specifying the source for each video, audio, and/or captions media element. That source might be a specific part of a primary input file, or it might be a separate file. In certain embodiments, to set up a job in job controller 108, a user specifies the types of output files (e.g., and packages) that are to be generated from the input. In certain embodiments, to set up a job in job controller 108, a user specifies the encoding settings to produce the quality and type of output that is desired.

In certain embodiments, the encoding service 110 is to encode the media file (e.g., video file and corresponding audio file) into a plurality of video and audio representations (e.g., streams). In FIG. 1, video encoder 112 is to receive an input of a video file and create video frame(s) 114 from that video file, e.g., for a video frame and/or fragment duration. In FIG. 1, audio encoder 116 is to receive an input of an audio file and create audio frame(s) 118 (e.g., a number of audio samples within each frame) for that audio file, e.g., at an audio frame and/or fragment duration. In certain embodiments, packaging service 120 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 110 may include a plurality of instances of video encoder 112 and audio encoder 116, e.g., to process multiple inputs in parallel. In certain embodiments, In certain embodiments, packaging service 120 includes one or more manifests 124, e.g., identifying the media file(s) 152 (e.g., fragments, streams, etc.). In certain embodiments, a manifest for a particular media file (e.g., a particular title) identifies a proper subset of video and audio representations of the media file for a particular client device 128 (e.g., based on the client's media player 130 (e.g., determined from its type ID value 132), display 134 resolution, audio output 136 capabilities, and/or available bandwidth). In certain embodiments, the content is stored in the content delivery service/system 102 in two parts: (i) the manifest 124 of all available media representations (e.g., their Uniform Resource Locator (URL) address(es) and, optionally, other characteristics) and (ii) the media files 152 (e.g., representations) (e.g., stream of fragments) in a single (e.g., container) or multiple files. In certain embodiments, a client device 128 is to read (or store) a manifest 140 (e.g., sent in response to manifest request 138) before the client device may make a request 146 for the media from that manifest, and thus access media files 148 (e.g., audio fragments and corresponding video fragments) from media file 152 storage.

In certain embodiments, secondary content insertion service 122 adds secondary content (e.g., advertisement(s)) into a main content. In certain embodiments, encoding service 110 is to encode both the main content and secondary content, e.g., and the secondary content insertion service 122 is to insert the secondary content into the main content.

However, in certain embodiments it is desirable to hide (e.g., at least some of) the time spent loading content (e.g., a media file 152) onto a client device 128, e.g., content including a video for viewing on display 134 and/or corresponding audio for transmitting as sound from audio output 136. Certain embodiments herein are directed to a content delivery service/system 102 and client device 128 (e.g., non-transitory computer-readable medium stored on the client device) to hide and/or reduce the time to a first frame of media file(s) 148 (e.g., and duration of displaying a waiting (e.g., loading) indication (e.g., spinner animation)) on display 134 to the client). Certain embodiments herein display a slate 126 concurrently with loading of media (e.g., a video), e.g., to hide and/or reduce the time to a first (e.g., in video order) frame and/or the time spent displaying a waiting (e.g., loading) indication (e.g., spinner animation). In certain embodiments, the slate 126 (e.g., a particular slate from slate file 144) is based on content within the media (e.g., video), for example, a slate that is adapted to the content of the video. In certain embodiments, content delivery service/system 102 includes (e.g., generates) a customized slate 126 for a (e.g., each) particular title. For example, as discussed below in reference to FIGS. 5-6.

In certain embodiments, when (e.g., content adaptive/specific) slate(s) 144 are to be present for various purposes, such as messages for customers about where they are, they are also utilized for quality of service (QoS) optimization, e.g., by hiding and/or reducing time to first frame and spinner animation duration, increasing the starting video quality (e.g., bit rate) in the beginning of a video, and hence increasing the percentage of a video that is displayed in a higher resolution (e.g., in ultra-high-definition (UHD) and/or high-definition (HD) (e.g., in short-term content). In certain embodiments, one or more slate images 144 are (i) delivered outside of manifest(s) 140 and/or the media (e.g., video) files 148 (e.g., fragments, clips, or packets) about video data (for example, according to a streaming standard, e.g., a Transmission Control Protocol (TCP) and/or User Datagram Protocol (UDP) based streaming), (ii) are cacheable, and/or (iii) are rendered by the client device 128. In certain embodiments, the video streaming is according to a standard, e.g., a Dynamic Adaptive Streaming over Hyper-Text Transfer Protocol (HTTP) (e.g., "MPEG-DASH" standard), an HTTP Live Streaming (HLS) standard, a Smooth Streaming standard, a UDP based standard, such as, but not limited to, video streaming from Sye® live streaming, or any other streaming protocols. Certain embodiments herein display a slate 144 (e.g., intro slate and/or outro slate) on a display 134 (e.g., screen) with client-side rendering rather than encoding them (e.g., "burning" them) into the media file(s) 148. In certain embodiments, in response to client device 128 receiving (e.g., from a user selecting a corresponding button) a play request for a media file, the client device is to send a slate file request 142 (e.g., concurrently with or before sending a manifest request 138). In certain embodiments, the slate file request 142 is separate from manifest request 138 and/or media file(s) request 146. In certain embodiments, the slate file request 142 is a part of manifest request 138 and/or media file(s) request 146.

In certain embodiments, the content delivery service/system 102, in response to slate file request 142, is to send a slate file 144 to client device 128 (e.g., separate from sending a manifest 140 and/or media file(s) 148). In certain embodiments, the client device does not decode (e.g., and/or perform a license check by license check (e.g., DRM) service 150) on the slate(s) in slate file(s) 144, and thus is to start displaying the slate (e.g., intro slate) on the display 134 (e.g., in real time or in human perceptible real time). In certain embodiments, certain (e.g., human perceptible) delays where no content (e.g., other than a waiting (e.g., loading) indication (e.g., spinner animation)) is being displayed is effectively hidden by displaying a slate, e.g., a slate customized for the video. In certain embodiments, starting the display of the separately provided slate (e.g., intro slate) before the media (e.g., video) from the media files (e.g., and/or any slate that is encoded therein) is ready to be displayed (e.g., in a desired resolution) on display 134 effectively hides at least a proper subset of that time period of not displaying content (e.g., other than a waiting indication) from a viewer of display 134. In certain embodiments, a slate file from slate file(s) 144 is displayed on display 134 (e.g., by media player 130) while the client device 128 (e.g., the media player 130) (i) obtains (e.g., loads into the client device 128) the manifest 140 (e.g., from manifest(s) 124 storage) and/or media files 148 (e.g., from media file(s) storage 152) and/or (ii) prepares (e.g., decodes) the media files for displaying on display 134.

In certain embodiments, media player 130 is to display a slate 144 that is provided separately from manifest 140 and/or media files 148, e.g., and is then to play the media (e.g., video) once it is ready for playing, e.g., and thus (i) hides and/or reduces the perceived time to first frame and/or (ii) removes and/or reduces any spinner animation duration, increases the starting video quality (e.g., bit rate) in the beginning of a video (e.g., by providing additional time to download a higher quality (e.g., and thus more bits) version of the video), and/or increases the percentage of time that a video is displayed in a higher resolution (e.g., when switching from a lower resolution to the higher resolution) (e.g., by providing additional time to determine such quality and/or download the higher resolution version). In certain embodiments, the perceived time to displaying the first frame is the time from the (e.g., end of) displaying the (e.g., intro) slate to the time the first frame is displayed to the viewer, e.g., the displaying of the slate is used to hide at least some of the time that the first frame is being downloaded and/or prepared (e.g., decoded) for display.

In certain embodiments, a threshold minimum time and/or threshold maximum time to display a (e.g., particular) slate is included (e.g., in media player 130). For example, where a video does not play (e.g., even if ready to be played) until the threshold minimum time has elapsed and/or displaying a waiting indication after the threshold maximum time has elapsed for a video that is not ready to be played yet (e.g., is still loading, going through license check, etc.).

Figure 2:
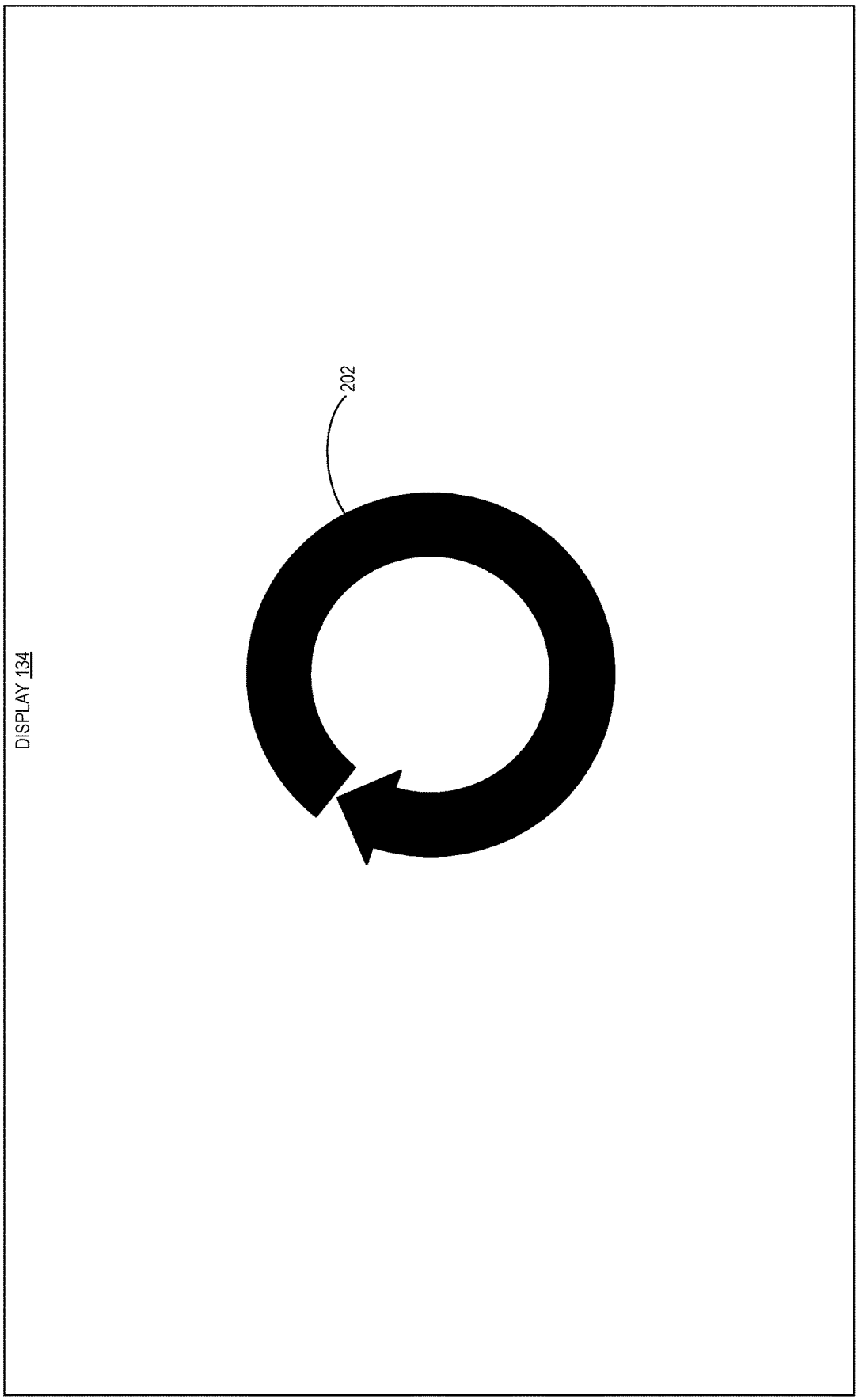
FIG. 2 is an example waiting (e.g., loading) indication (e.g., "spinner") being displayed on a display of a client device according to some embodiments.

FIG. 2 is an example waiting (e.g., loading) indication 202 (e.g., "spinner") being displayed on a display of a client device according to some embodiments. In certain embodiments, the waiting indication 202 is displayed while waiting for (e.g., new) content to be displayed (e.g., waiting for new content to be loaded, its licensed checked, and/or other operation delays).

Figure 3:
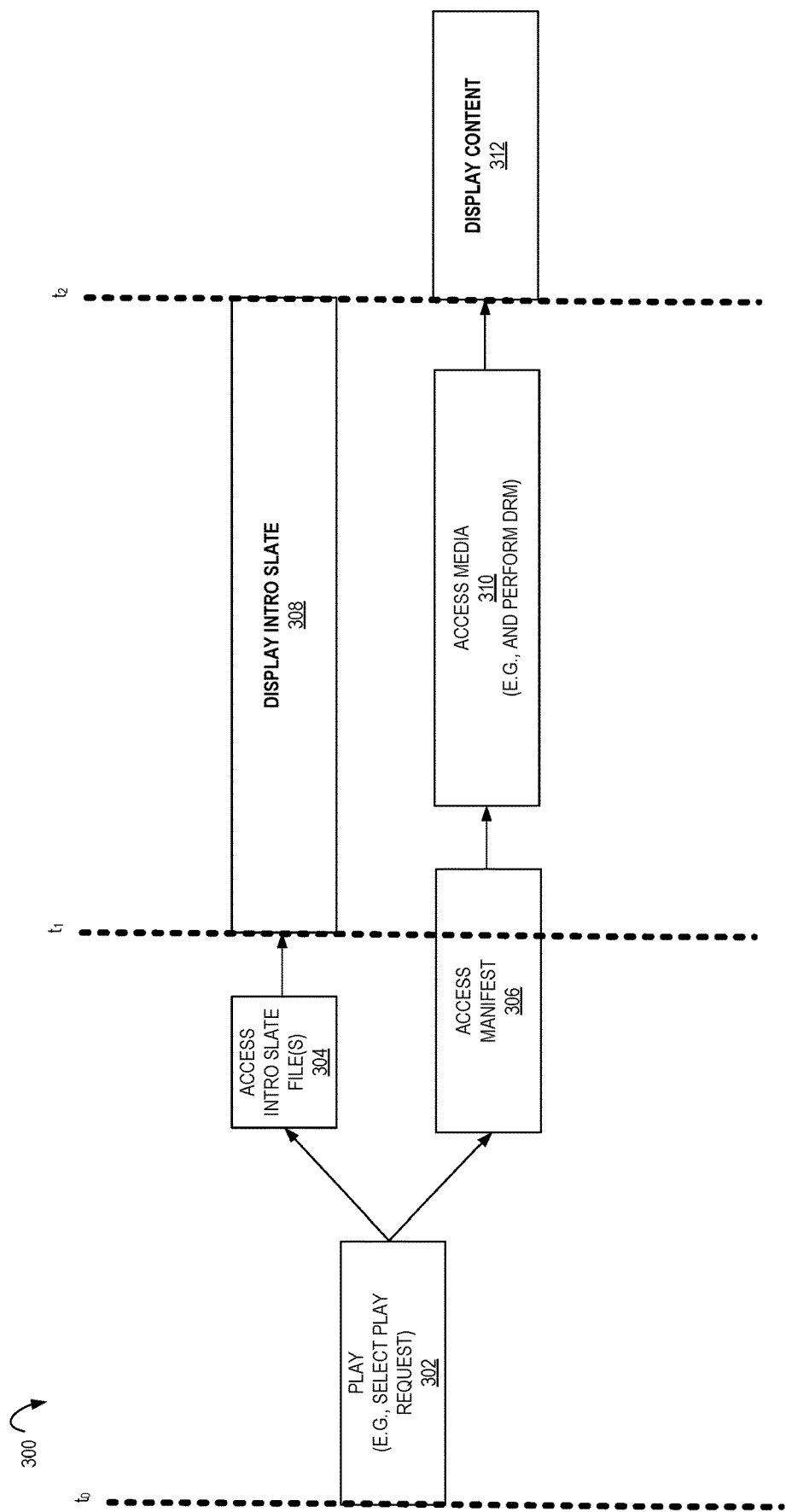
FIG. 3 is a flow diagram illustrating operations of a method for displaying an intro slate and then content (e.g., a video) according to some embodiments.
Figure 4:
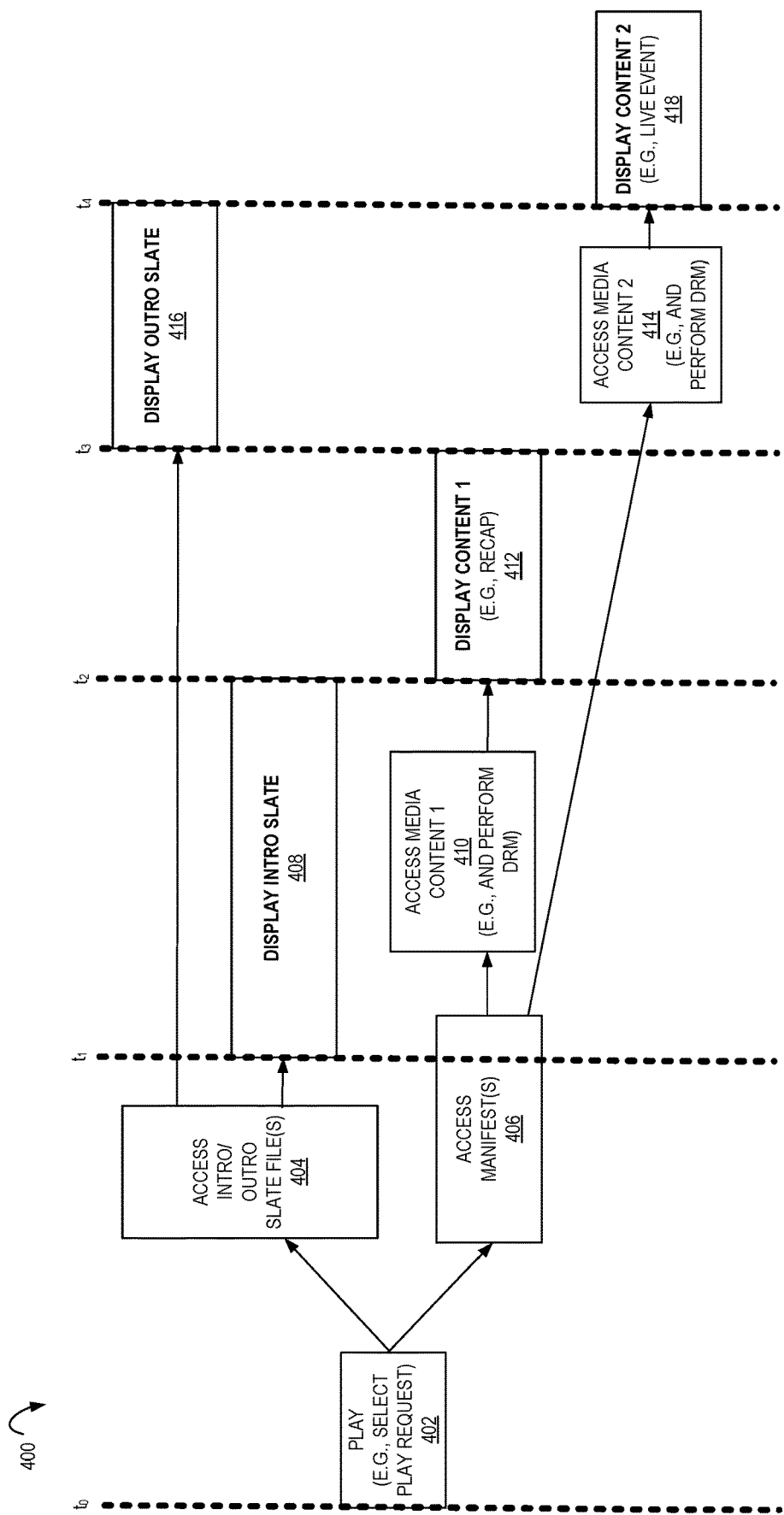
FIG. 4 is a flow diagram illustrating operations of a method for displaying an intro slate, first content (e.g., a first video), an outro slate, and then second content (e.g., a second video) according to some embodiments.

Turning now to FIGS. 3-4, example flows using one or more slates are discussed. It should be understood that the duration, start time, and/or end time of the boxes in FIGS. 3 and 4 are merely examples and any other durations, start times, and/or end times for each of the components (e.g., blocks) therein may be utilized. For example, the access manifest 306 in FIG. 3 may end before time 1 ($t_1$) and/or the beginning of access media 310 in FIG. 3 may begin before or at time 1 ($t_1$).

FIG. 3 is a flow diagram illustrating operations 300 of a method for displaying an intro slate and then content (e.g., a video) according to some embodiments. Some or all of the operations 300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 300 are performed by a client device (e.g., client device 128 or device 1100), for example, along with content delivery system 102 (e.g., implemented in a provider network) of the other figures.

The operations 300 include, at block 302, a media file (e.g., movie, television show, live (e.g., sporting) event, etc.) being requested to be played, e.g., in response to a command being received on a device to play. In certain embodiments, this is referred to as time zero (to). The operations 300 further include, at block 304, accessing an intro slate file, e.g., concurrently with accessing a manifest of the media file (e.g., a manifest and/or media file that does not include the slate) at block 306. The operations 300 further include, at block 308, displaying the intro slate. In certain embodiments, the displaying of the intro slate begins at time 1 ($t_1$). In certain embodiments, the displaying of the intro slate is concurrently with accessing the manifest and/or the media file(s) identified by the manifest (e.g., a manifest and/or media file that does not include the slate) at block 310. In certain embodiments, the operations 300 include performing a check of a (e.g., DRM) license for the media content, for example, at block 310.

In certain embodiments (e.g., after the media is ready to be displayed), the operations 300 further include, at block 312, stopping displaying of the intro slate and beginning displaying the media (e.g., content) of the media file. In certain embodiments, this is referred to as time two ($t_2$).

FIG. 4 is a flow diagram illustrating operations 400 of a method for displaying an intro slate, first content (e.g., a first video), an outro slate, and then second content (e.g., a second video) according to some embodiments. In certain embodiments, the first video is a recap of the second video up to a point in the (e.g., live) video (e.g., joining it not at the beginning or the end) where the video is to be joined (e.g., displayed). Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by a client device (e.g., client device 128 or device 1100), for example, along with content delivery system 102 (e.g., implemented in a provider network) of the other figures.

The operations 400 include, at block 402, a first media file (e.g., for a movie, television show, live (e.g., sporting) event, etc.) being requested to be played, e.g., in response to a command being received on a device to play. In certain embodiments, this is referred to as time zero (to). The operations 400 further include, at block 404, accessing an intro and outro slate file(s), e.g., concurrently with accessing a manifest of the first media file (e.g., and/or the second file) (e.g., a manifest, first media file, and/or second media file that does not include the slate) at block 406. The operations 400 further include, at block 408, displaying the intro slate. In certain embodiments, the displaying of the intro slate begins at time 1 ($t_1$). In certain embodiments, the displaying of the intro slate is concurrently with accessing the (e.g., first media's) manifest and/or the (e.g., first) media file(s) identified by the manifest (e.g., a manifest, first media file, and/or second media file that does not include the slate) at block 410. In certain embodiments, the operations 400 include performing a check of a (e.g., DRM) license for the first media content, for example, at block 410. In certain embodiments (e.g., after the first media is ready to be displayed), the operations 400 further include, at block 412, stopping displaying of the intro slate and beginning displaying the first media (e.g., content) of the first media file. In certain embodiments, this is referred to as time two ($t_2$). The operations 400 further include, at block 416, stopping displaying of the first media (e.g., content) of the first media file and displaying an outro slate, e.g., and (e.g., if not completed yet) (i) accessing the second media file's manifest and/or the second media file(s) identified by the (e.g., second file's) manifest (e.g., a manifest, first media file, and/or second media file that does not include the slate) at block 414. In certain embodiments, the displaying of the outro slate begins at time 3 ($t_3$). In certain embodiments, the displaying of the outro slate is concurrently with accessing the (e.g., second file's) manifest and/or the second media file(s) identified by its manifest (e.g., a manifest, first media file, and/or second media file that does not include the slate) at block 414. In certain embodiments, the operations 400 include performing a check of a (e.g., DRM) license for the second media content, for example, at block 414. In certain embodiments (e.g., after the second media is ready to be displayed), the operations 400 further include, at block 418, stopping displaying of the outro slate and beginning displaying the second media (e.g., content) of the second media file. In certain embodiments, this is referred to as time four ($t_4$).

In certain embodiments, a slate is customized for each individual event, e.g., each game of a sporting match, such as, but not limited to, each individual game of baseball, softball, football, soccer, basketball, hockey, etc.

In certain embodiments, a slate is customized for one or more languages (e.g., in addition to being customized based on content of the corresponding video it is displayed before and/or after).

Figure 5:
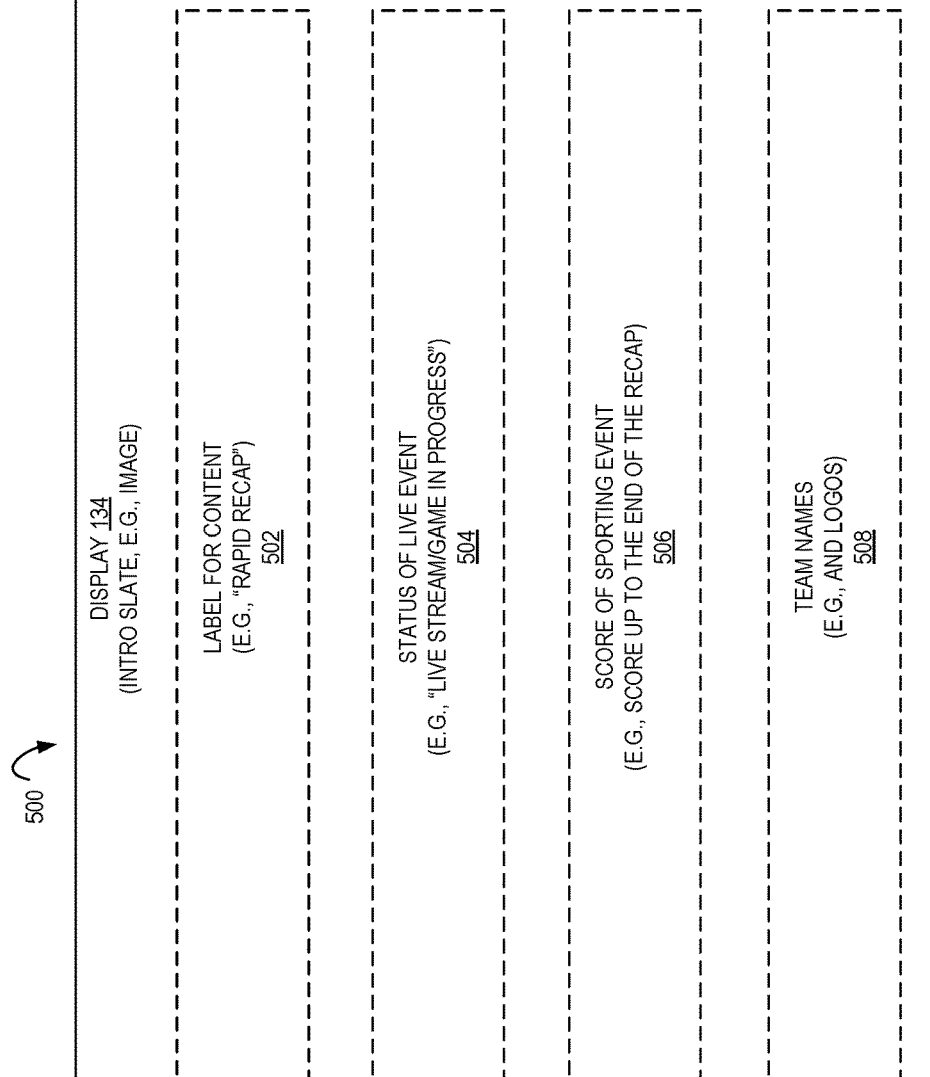
FIG. 5 is an example format of an intro slate displayed on a display of a client device according to some embodiments.

FIG. 5 is an example format of an intro slate 500 displayed on a display 134 of a client device according to some embodiments. In certain embodiments, the intro slate 500 is customized based on the video that is to be the intro for. In certain embodiments, the intro slate 500 includes one or any combination (e.g., all of): a label 502 for the next content (e.g., video), for example, "Rapid Recap", a status 504 of the live event, for example, "Live stream/game in progress", a score 506 of a sporting event, for example, a (e.g., non-final) score up to the end of the recap, and/or team names 508 (e.g., and team logos). Intro slate 500 may include a logo (e.g., and/or name) of the live streamer (e.g., network logo).

Figure 6:
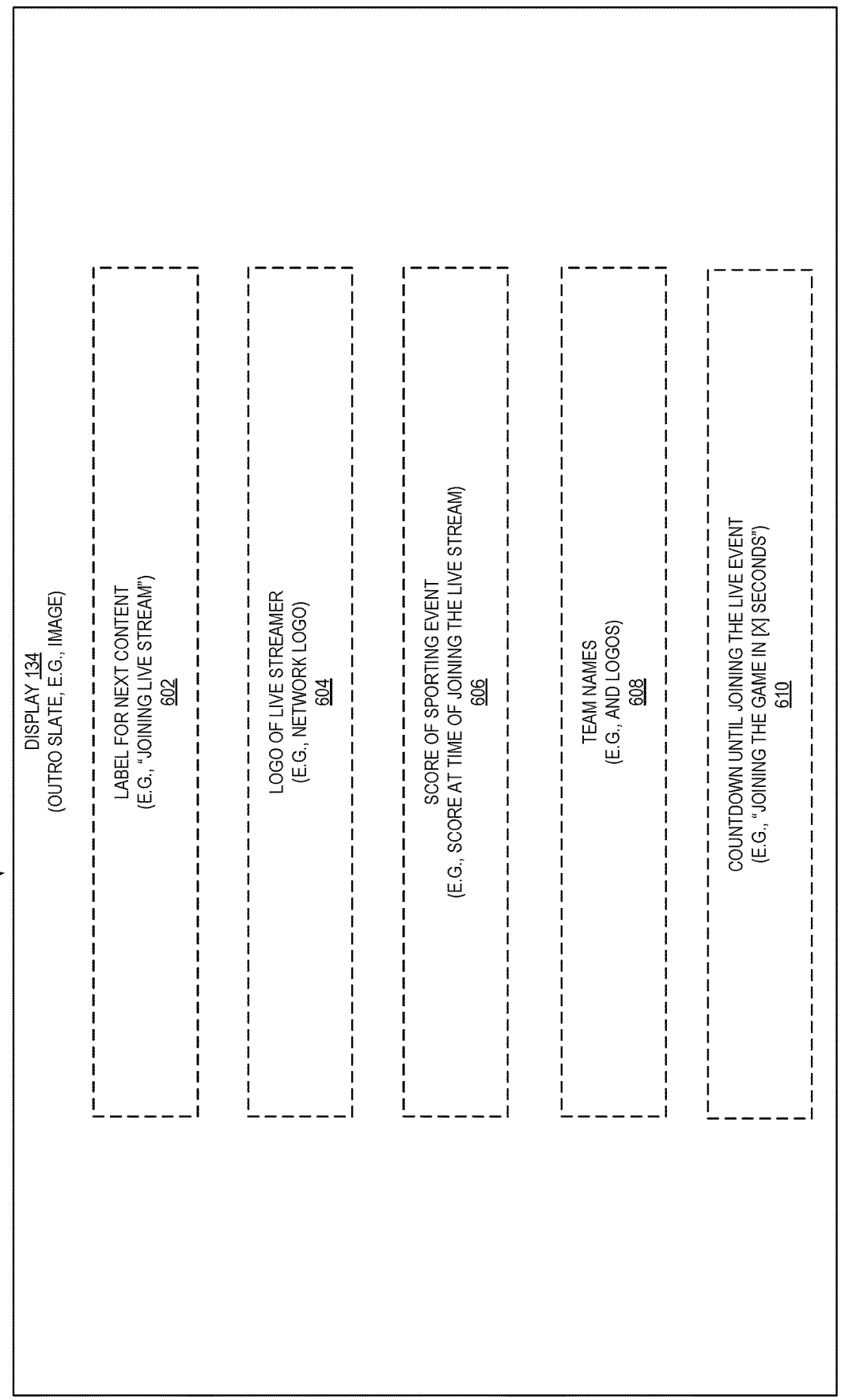
FIG. 6 is an example format of an outro slate displayed on a display of a client device according to some embodiments.

FIG. 6 is an example format of an outro slate 600 displayed on a display 134 of a client device according to some embodiments. In certain embodiments, the outro slate 600 is customized based on the video that is to be the outro for. In certain embodiments, the outro slate 600 is customized based on the video that is to be the outro for. In certain embodiments, the outro slate 600 includes one or any combination (e.g., all of): a label 602 for the next content (e.g., video), for example, "Joining a live stream", a logo 604 of the live streamer (e.g., network logo), a score 606 of a sporting event, for example, a (e.g., non-final) score at the time of joining the live stream, team names 608 (e.g., and team logos), and/or a countdown 610 of an (e.g., estimated) time until joining the live event.

Figure 7:
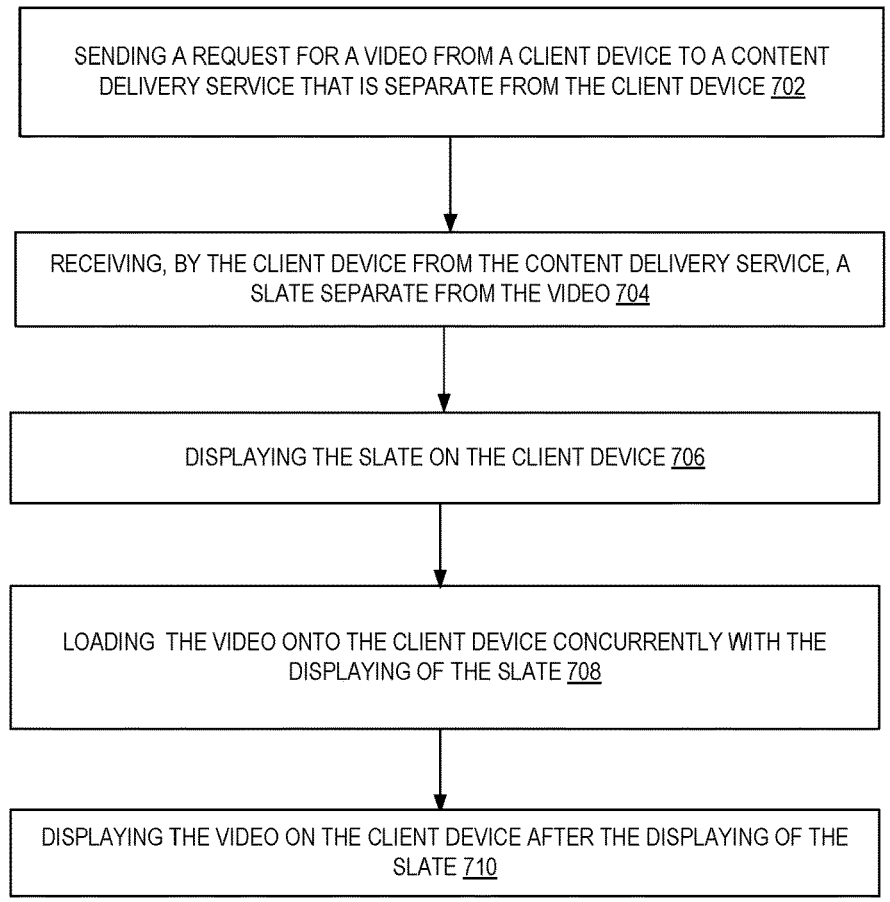
FIG. 7 is a flow diagram illustrating operations of a method of displaying a slate and then a video according to some embodiments.

FIG. 7 is a flow diagram illustrating operations 700 of a method of displaying a slate and then a video according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by a client device (e.g., client device 128 or device 1100), for example, along with content delivery system 102 (e.g., implemented in a provider network) of the other figures.

The operations 700 include, at block 702, sending a request for a video from a client device to a content delivery service that is separate from the client device. The operations 700 further include, at block 704, receiving, by the client device from the content delivery service, a slate separate from the video. The operations 700 further include, at block 706, displaying the slate on the client device. The operations 700 further include, at block 708, loading the video onto the client device concurrently with the displaying of the slate (e.g., beginning displaying the slate before the loading (or displaying) of an initial frame of the video begins and/or is completed). The operations 700 further include, at block 710, displaying the video on the client device after the displaying of the slate.

Exemplary environments, systems, etc. that the above may be used in are detailed below.

At least some embodiments of the disclosed technologies can be described in view of the following examples:

Example 1. A computer-implemented method comprising:
   sending a request for a video from a client device to a content delivery service that is separate from the client device;
   receiving, by the client device from the content delivery service, a manifest of the video and an intro slate separate from the manifest and separate from the video;
   displaying the intro slate on the client device;
   loading an initial frame of the video identified by the manifest onto the client device concurrently with the displaying of the intro slate; and
   displaying the video on the client device after the displaying of the intro slate.

Example 2. The computer-implemented method of example 1, further comprising:
   receiving, by the client device from the content delivery service, an outro slate separate from the manifest and the video; and
   displaying the outro slate on the client device after the displaying of the video.

Example 3. The computer-implemented method of example 2, further comprising:
   sending a request for a second video from the client device to the content delivery service that is separate from the client device;
   receiving, by the client device from the content delivery service, a second manifest of the second video;
   loading the second video identified by the second manifest onto the client device concurrently with the displaying of the outro slate; and
   displaying the second video on the client device after the displaying of the outro slate.

Example 4. A computer-implemented method comprising:
   sending a request for a video from a client device to a content delivery service that is separate from the client device;
   receiving, by the client device from the content delivery service, a slate separate from the video;
   displaying the slate on the client device;
   loading the video onto the client device concurrently with the displaying of the slate; and
   displaying the video on the client device after the displaying of the slate.

Example 5. The computer-implemented method of example 4, wherein the slate comprises an intro slate.

Example 6. The computer-implemented method of example 5, wherein the intro slate is customized based on content of the video.

Example 7. The computer-implemented method of example 5, wherein the intro slate is a single image.

Example 8. The computer-implemented method of example 4, wherein the slate comprises an outro slate for an immediately previous video displayed on the client device.

Example 9. The computer-implemented method of example 8, wherein the outro slate is customized based on content of the immediately previous video.

Example 10. The computer-implemented method of example 8, wherein the video is a live event that is in progress, and the immediately previous video is a recap of the live event up to about a time the live event is to be displayed on the client device.

Example 11. The computer-implemented method of example 10, wherein the live event is a sporting event, and the outro slate comprises a non-final score of the sporting event.

Example 12. The computer-implemented method of example 8, wherein the outro slate is a single image.

Example 13. The computer-implemented method of example 4, wherein the slate is received by the client device before the client device receives any of the video.

Example 14. The computer-implemented method of example 4, wherein the slate is not identified in a manifest sent to the client device for the video by the content delivery service.

Example 15. A non-transitory computer-readable medium storing code that, when executed by a device, causes the device to perform a method comprising:
   sending a request for a video from the device to a content delivery service that is separate from the device;
   receiving, by the device from the content delivery service, a slate separate from the video;
   displaying the slate on the device;
   loading the video onto the device concurrently with the displaying of the slate; and
   displaying the video on the device after the displaying of the slate.

Example 16. The non-transitory computer-readable medium of example 15, wherein the slate comprises an intro slate customized based on convent of the video.

Example 17. The non-transitory computer-readable medium of example 15, wherein the slate is an outro slate customized based on content of an immediately previous video displayed on the device.

Example 18. The non-transitory computer-readable medium of example 17, wherein the video is a live event that is in progress, and the immediately previous video is a recap of the live event up to about a time the live event is to be displayed on the device.

Example 19. The non-transitory computer-readable medium of example 15, wherein the slate is received by the device before the device receives any of the video.

Example 20. The non-transitory computer-readable medium of example 15, wherein the slate is not identified in a manifest sent to the device for the video by the content delivery service.

Figure 8:
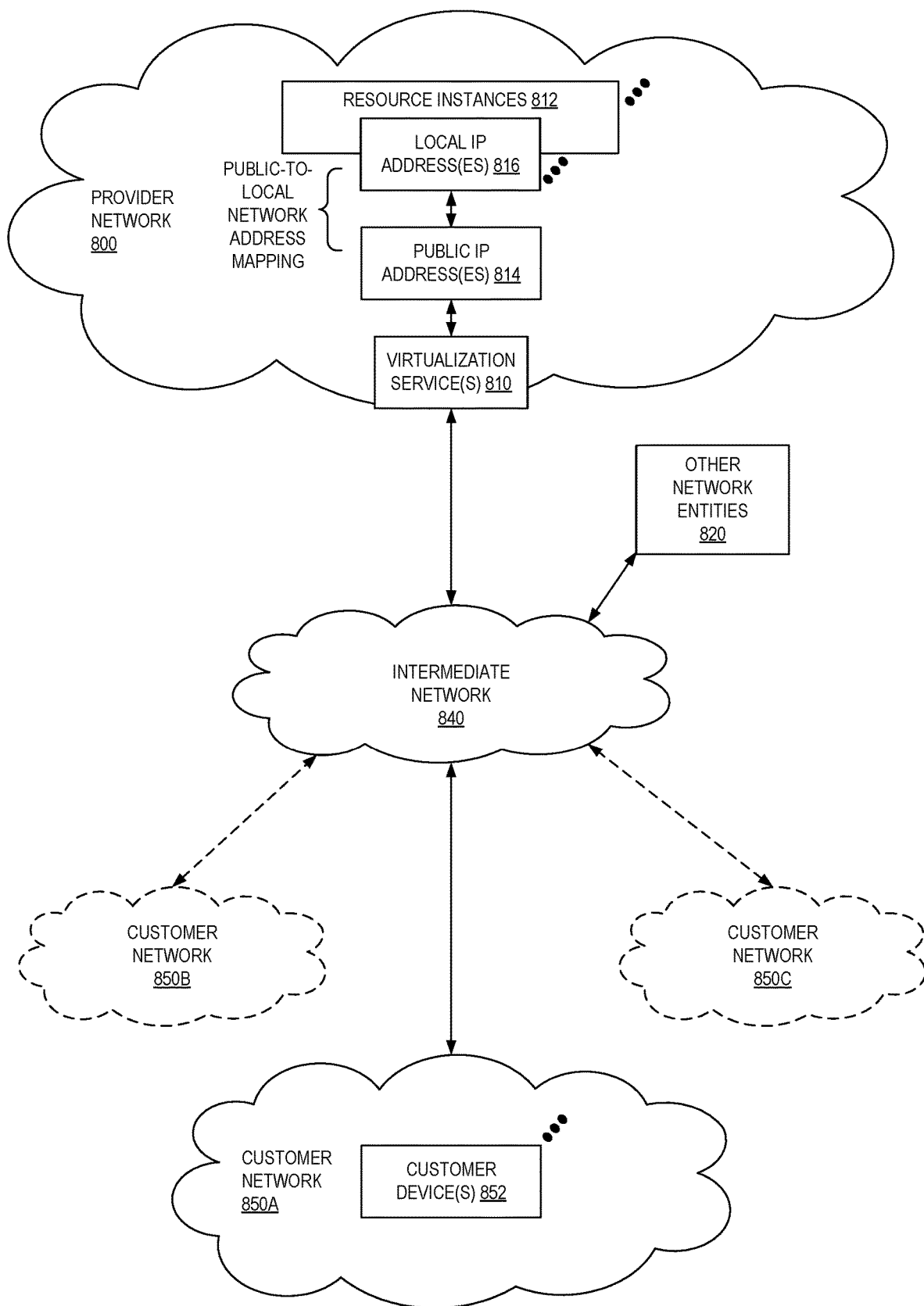
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider network 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
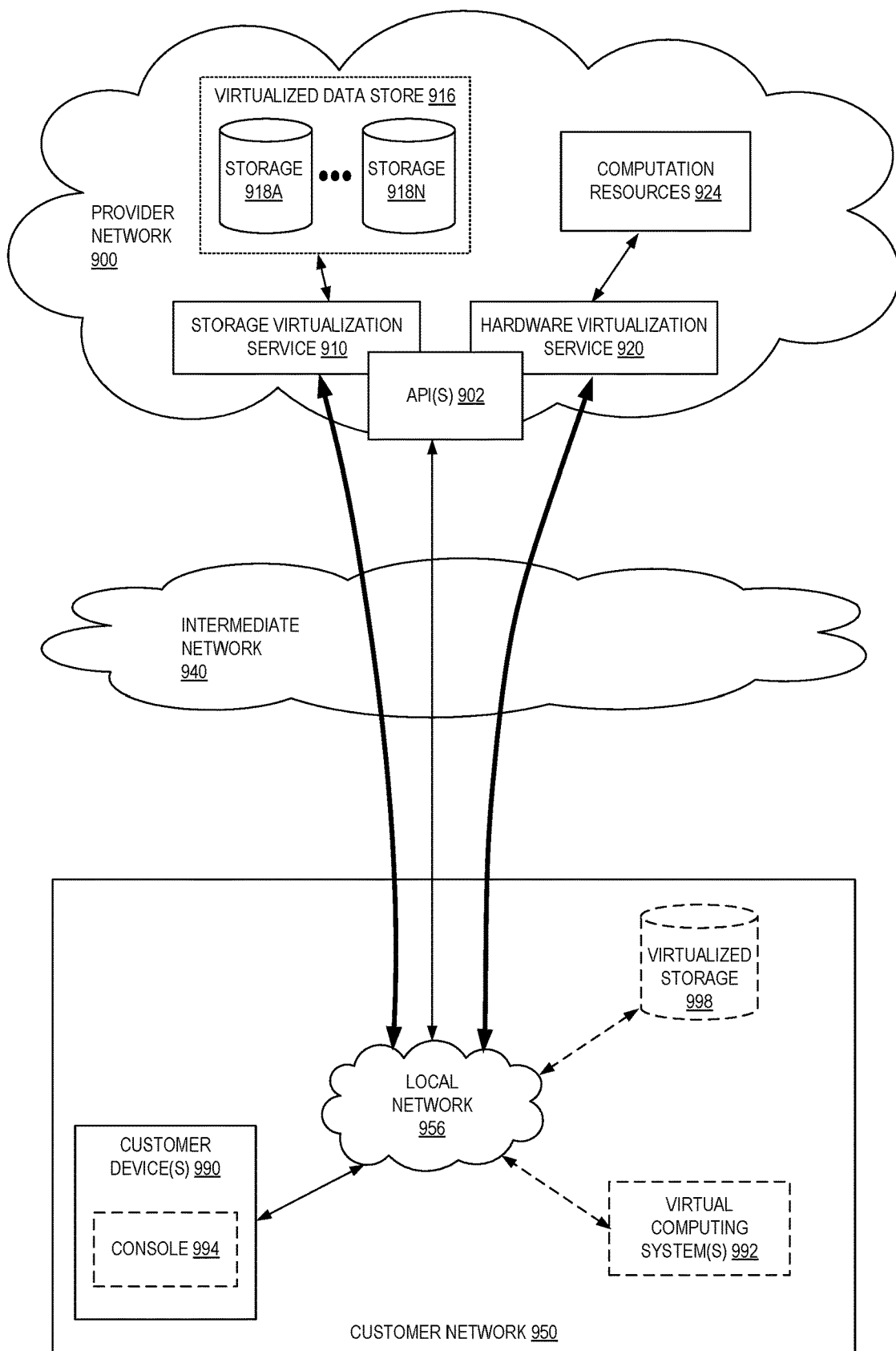
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
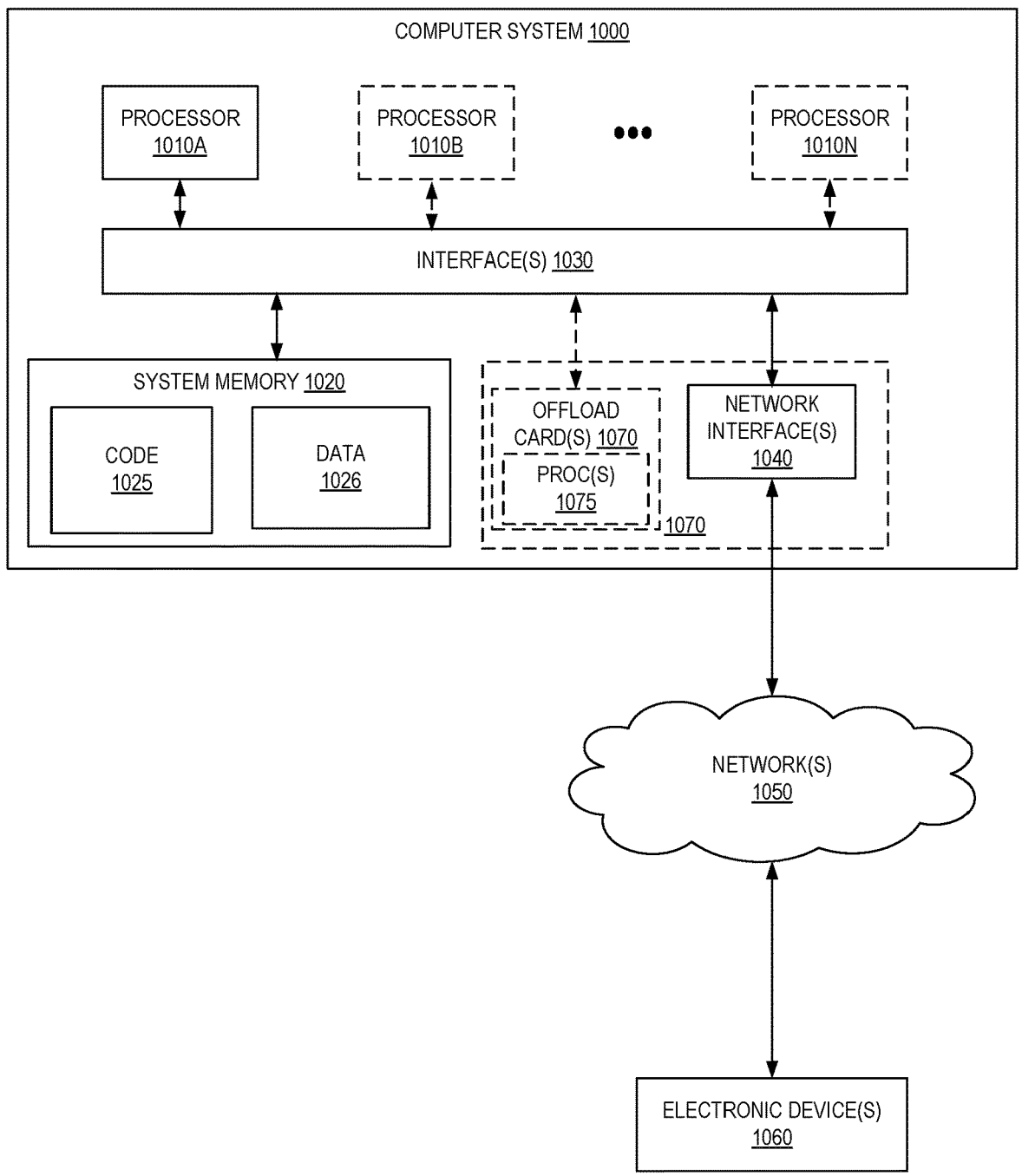
FIG. 10 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing, or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
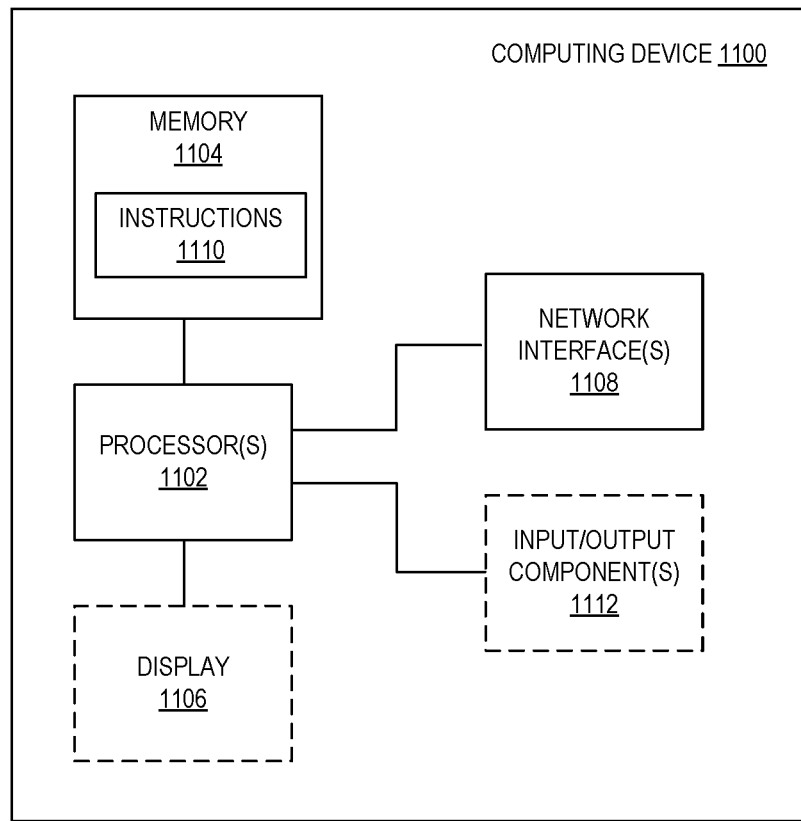
FIG. 11 illustrates a logical arrangement of a set of general components of an exemplary computing device that can be utilized in accordance with various embodiments.

FIG. 11 illustrates a logical arrangement of a set of general components of an example computing device 1100. Generally, a computing device 1100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1104) to store code (for example, instructions 1110, e.g., which implement a content delivery service as disclosed herein), and a set of one or more wired or wireless network interfaces 1108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1104) of a given electronic device typically stores code (e.g., instructions 1110) for execution on the set of one or more processors 1102 of that electronic device. One or more parts of various embodiments may be implemented using different combinations of software, firmware, and/or hardware.

A computing device 1100 can include some type of display element 1106, such as a touch screen or liquid crystal display (LCD), although many devices such as portable media players might convey information via other means, such as through audio speakers, and other types of devices such as server end stations may not have a display element 1106 at all. As discussed, some computing devices used in some embodiments include at least one input and/or output component(s) 1112 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 12:
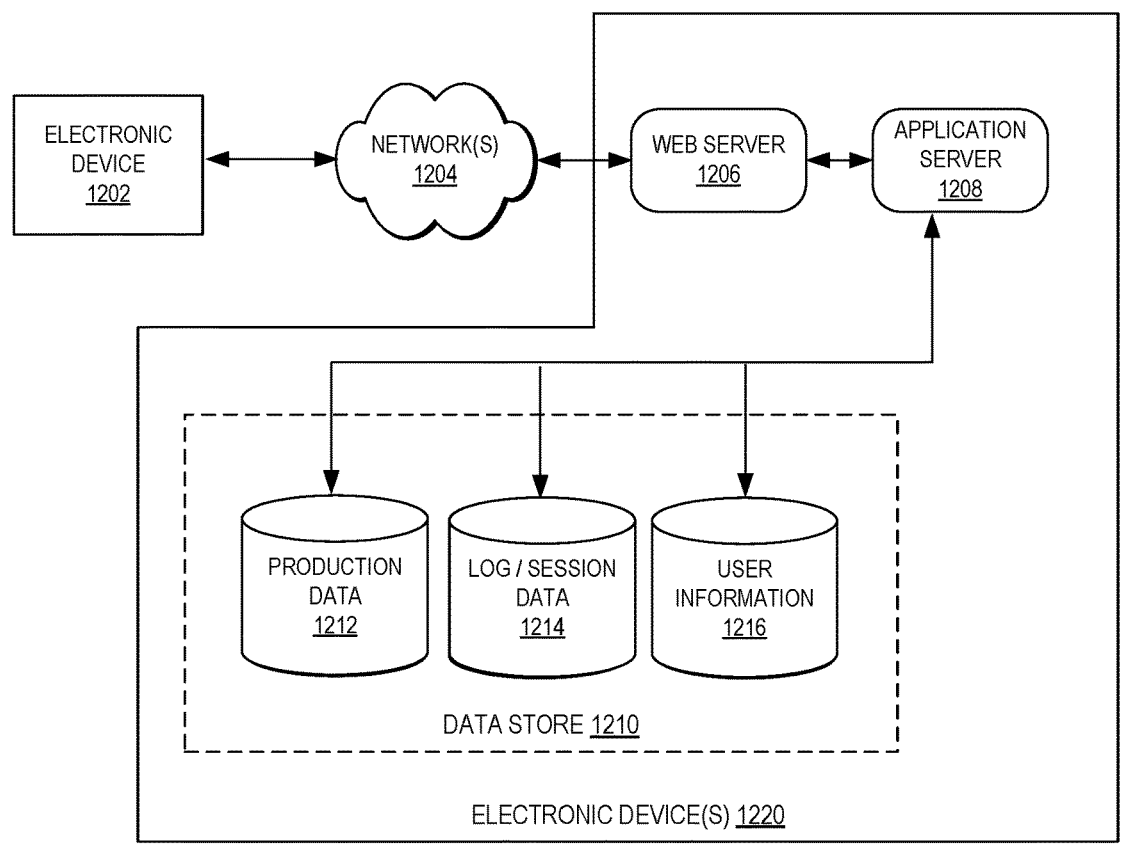
FIG. 12 illustrates an example of an environment for implementing aspects in accordance with various embodiments.

As discussed, different approaches can be implemented in various environments in accordance with the described embodiments. For example, FIG. 12 illustrates an example of an environment 1200 for implementing aspects in accordance with various embodiments. For example, in some embodiments messages are HyperText Transfer Protocol (HTTP) requests that are received by a web server (e.g., web server 1206), and the users, via electronic devices, may interact with the provider network via a web portal provided via the web server 1206 and application server 1208. As will be appreciated, although a web-based environment is used for purposes of explanation, different environments may be used, as appropriate, to implement various embodiments. The system includes an electronic client device 1202, which may also be referred to as a client device and can be any appropriate device operable to send and receive requests, messages, or information over an appropriate network 1204 and convey information back to a user of the device 1202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device 1202 and handling a majority of the data access and business logic for an application. The application server 1208 provides access control services in cooperation with the data store 1210 and is able to generate content such as text, graphics, audio, video, etc., to be transferred to the client device 1202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1202 and the application server 1208, can be handled by the web server 1206. It should be understood that the web server 1206 and application server 1208 are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store 1210 also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store 1210 might access the user information 1216 to verify the identity of the user and can access a production data 1212 to obtain information about items of that type. The information can then be returned to the user, such as in a listing of results on a web page that the user is able to view via a browser on the user device 1202. Information for a particular item of interest can be viewed in a dedicated page or window of the browser.

The web server 1206, application server 1208, and/or data store 1210 may be implemented by one or more electronic devices 1220, which can also be referred to as electronic server devices or server end stations, and may or may not be located in different geographic locations. Each of the one or more electronic devices 1220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
sending a request for a video from a client device to a content delivery service that is separate from the client device;
receiving, by the client device from the content delivery service, a manifest of the video and an intro slate separate from the manifest;
displaying the intro slate on the client device while the manifest is being received;
loading an initial frame of the video identified by the manifest onto the client device; and
displaying the video on the client device after the displaying of the intro slate.

2. The computer-implemented method of claim 1, further comprising:
sending a request for an outro slate from the client device to the content delivery service that is separate from the client device;
receiving, by the client device from the content delivery service, the outro slate separate from the manifest and the video; and
displaying the outro slate on the client device after the displaying of the video.

3. The computer-implemented method of claim 2, further comprising:
sending a request for a second video from the client device to the content delivery service that is separate from the client device;
receiving, by the client device from the content delivery service, a second manifest of the second video;
loading the second video identified by the second manifest onto the client device concurrently with the displaying of the outro slate; and
displaying the second video on the client device after the displaying of the outro slate.

4. A computer-implemented method comprising:
sending a request for a video from a client device to a content delivery service that is separate from the client device;
receiving, by the client device from the content delivery service, a slate separate from the video;
displaying the slate on the client device while a license for the video requested to be displayed is checked; and
displaying the video on the client device, after the displaying of the slate, in response to the license being verified.

5. The computer-implemented method of claim 4, wherein the slate comprises an intro slate.

6. The computer-implemented method of claim 5, wherein the intro slate is customized based on content of the video.

7. The computer-implemented method of claim 5, wherein the intro slate is a single image available from the content delivery service in multiple resolutions.

8. The computer-implemented method of claim 4, wherein the slate comprises an outro slate for an immediately previous video displayed on the client device.

9. The computer-implemented method of claim 8, wherein the outro slate is customized based on content of the immediately previous video.

10. The computer-implemented method of claim 8, wherein the video is a live event that is in progress, and the immediately previous video is a recap of the live event up to about a time the live event is to be displayed on the client device.

11. The computer-implemented method of claim 10, wherein the live event is a sporting event, and the outro slate comprises a non-final score of the sporting event.

12. The computer-implemented method of claim 8, wherein the outro slate is a single image available from the content delivery service in multiple resolutions.

13. The computer-implemented method of claim 4, wherein the slate is received by the client device before the client device receives any of the video.

14. The computer-implemented method of claim 4, wherein the slate is not identified in a manifest sent to the client device for the video by the content delivery service.

15. A non-transitory computer-readable medium storing code that, when executed by a device, causes the device to perform a method comprising:
  sending a request for a video from the device to a content delivery service that is separate from the device;
  receiving, by the device from the content delivery service, a slate separate from the video;
  displaying the slate on the device while a license for the video requested to be displayed is checked; and
  displaying the video on the device, after the displaying of the slate, in response to the license being verified.

16. The non-transitory computer-readable medium of claim 15, wherein the slate comprises an intro slate customized based on content of the video.

17. The non-transitory computer-readable medium of claim 15, wherein the slate is an outro slate customized based on content of an immediately previous video displayed on the device.

18. The non-transitory computer-readable medium of claim 17, wherein the video is a live event that is in progress, and the immediately previous video is a recap of the live event up to about a time the live event is to be displayed on the device.

19. The non-transitory computer-readable medium of claim 15, wherein the slate is received by the device before the device receives any of the video.

20. The non-transitory computer-readable medium of claim 15, wherein the slate is a single image available from the content delivery service in multiple resolutions.

* * * * *